US008594479B2

(12) United States Patent
Liu et al.

(10) Patent No.: US 8,594,479 B2
(45) Date of Patent: Nov. 26, 2013

(54) DUST CAP ASSEMBLY FOR SEALING AN OPTICAL FIBER FERRULE AND METHODS THEREOF

(75) Inventors: Ziwei Liu, Ft. Worth, TX (US); Charles A. Yow, Jr., Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 272 days.

(21) Appl. No.: 12/789,874

(22) Filed: May 28, 2010

(65) Prior Publication Data

US 2010/0303434 A1    Dec. 2, 2010

Related U.S. Application Data

(60) Provisional application No. 61/182,379, filed on May 29, 2009, provisional application No. 61/182,361, filed on May 29, 2009.

(51) Int. Cl.
*G02B 6/00* (2006.01)
*G02B 6/32* (2006.01)
*G02B 6/36* (2006.01)

(52) U.S. Cl.
USPC ............................. 385/139; 385/33; 385/93

(58) Field of Classification Search
USPC .................... 385/33–35, 74, 93, 139
See application file for complete search history.

(56) References Cited

U.S. PATENT DOCUMENTS

| 4,147,402 | A | * | 4/1979 | Chown | 385/33 |
|---|---|---|---|---|---|
| 4,378,954 | A | * | 4/1983 | Baker | 385/80 |
| 4,531,810 | A | * | 7/1985 | Carlsen | 385/137 |
| 4,691,985 | A | * | 9/1987 | Shank et al. | 385/84 |
| 4,770,488 | A | * | 9/1988 | Shank et al. | 385/79 |
| 5,414,790 | A | | 5/1995 | Lee et al. | 385/139 |
| 6,227,717 | B1 | | 5/2001 | Ott et al. | 385/53 |
| 6,547,450 | B2 | | 4/2003 | Lampert | 385/78 |
| 6,554,485 | B1 | | 4/2003 | Beatty et al. | 385/72 |
| 6,625,351 | B2 | * | 9/2003 | Cox et al. | 385/33 |
| 6,712,524 | B2 | | 3/2004 | Beatty et al. | 385/72 |
| 7,113,671 | B2 | * | 9/2006 | Sergey et al. | 385/33 |
| 7,164,840 | B2 | | 1/2007 | Hsieh | 385/134 |
| 7,186,038 | B2 | * | 3/2007 | Hovland et al. | 385/94 |
| 7,245,813 | B2 | | 7/2007 | Brown et al. | 385/139 |
| 7,369,741 | B2 | | 5/2008 | Reagan et al. | 385/139 |
| 7,565,053 | B2 | | 7/2009 | Zimmel et al. | 385/139 |
| 7,572,066 | B2 | | 8/2009 | De Jong et al. | 385/88 |
| 7,588,375 | B2 | * | 9/2009 | Hovland et al. | 385/94 |
| 7,630,610 | B2 | | 12/2009 | Cobb, III et al. | 385/139 |
| 7,751,661 | B2 | * | 7/2010 | Kadomi et al. | 385/36 |
| 8,126,307 | B2 | * | 2/2012 | Hovland et al. | 385/139 |
| 8,330,944 | B2 | * | 12/2012 | Liu et al. | 356/73.1 |
| 2001/0033712 | A1 | * | 10/2001 | Cox et al. | 385/33 |

(Continued)

OTHER PUBLICATIONS

International Search Report, mailed Aug. 4, 2010, in reference to co-pending Appl. No. PCT/US 10/36376, filed May 27, 2010.

*Primary Examiner* — Rhonda Peace

(57) ABSTRACT

A dust cap assembly includes a sleeve and a sealant that seals an end face portion of a fiber optic ferrule from contaminants and, upon removal, provides remedial cleaning of any foreign matter present on the ferrule when the dust cap assembly was initially installed along with methods of making the same. The sleeve of the dust cap assembly has a through bore and a distal end for receiving the sealant. Further, the sealant may optionally have advantageous mechanical and optical properties such that the dust cap assembly may function as a terminator for testing.

25 Claims, 14 Drawing Sheets

(56) References Cited

U.S. PATENT DOCUMENTS

| | | | |
|---|---|---|---|
| 2003/0002812 A1 | 1/2003 | Lampert | 385/78 |
| 2003/0108302 A1 | 6/2003 | Chang | 385/76 |
| 2003/0123812 A1 | 7/2003 | Beatty et al. | 385/72 |
| 2005/0220434 A1 | 10/2005 | Hsieh | 385/134 |
| 2005/0241089 A1 | 11/2005 | Brunner et al. | 15/104.94 |
| 2006/0285814 A1 | 12/2006 | Brown et al. | 385/139 |
| 2007/0160327 A1 | 7/2007 | Lewallen et al. | 385/53 |
| 2007/0172172 A1 | 7/2007 | Theuerkorn et al. | 385/53 |
| 2007/0217749 A1 | 9/2007 | De Jong et al. | 385/88 |
| 2008/0075406 A1* | 3/2008 | Kadomi et al. | 385/79 |
| 2008/0298749 A1* | 12/2008 | Hovland et al. | 385/80 |
| 2008/0304804 A1 | 12/2008 | Zimmel et al. | 385/139 |
| 2008/0310795 A1 | 12/2008 | Parkman, III et al. | 385/60 |
| 2009/0002689 A1 | 1/2009 | Cobb, III et al. | 356/73.1 |
| 2010/0074588 A1 | 3/2010 | Zimmel et al. | 385/139 |
| 2010/0302530 A1* | 12/2010 | Liu et al. | 356/73.1 |
| 2010/0303425 A1* | 12/2010 | Liu | 385/94 |
| 2010/0303434 A1* | 12/2010 | Liu et al. | 385/139 |

* cited by examiner

DUST CAP ASSEMBLY FOR SEALING AN OPTICAL FIBER FERRULE AND METHODS THEREOF

RELATED APPLICATIONS

This application claims the benefit of U.S. Provisional Application Ser. Nos. 61/182,379 and 61/182,361 both filed on May 29, 2009, the entire contents of both which are incorporated herein by reference.

BACKGROUND

1. Technical Field

The disclosure relates to dust cap assemblies for fiber optic ferules used in fiber optic connectors. Specifically, the dust cap assembly seals the fiber optic ferrule from contaminants during its incumbency and, upon removal, provides remedial cleaning of any foreign matter present on the ferrule when the dust cap assembly was initially installed. In other embodiments, the dust cap assembly may optionally function as a terminator for testing the integrity of an optical cable assembly or as enabling a non-contact continuity test for fiber optic patch cables.

2. Technical Background

The capacity to send information over a wire revolutionized communication. Copper wire was the standard for more than 150 years, with ease of use and interconnection, but as bandwidth demand increased, it was necessary to seek alternative mediums. Optical fiber, developed and perfected over the past three decades, has made its presence felt, providing secure, high capacity signal transmission; in the past used primarily for long distance signal transmission due to its tremendous efficiency and security, but unable to easily leverage these attributes in more localized arenas. With developments in the joining of truncated fibers, suddenly optical fiber was becoming as versatile as copper. Optical fiber could be cut and easily rejoined via splicing, either by laser, electric arc or mechanical splicing, and by other mechanical processes. Of the mechanical processes developed, the ability to mate and de-mate an optical fiber to another optical fiber completed the versatility picture. Fiber optic ferrules and fiber optic connectors provided easy junction points in the field that tremendously increased the ease of use of optical fibers. Polishing optical fibers within appropriate ferrules is necessary to efficiently join two fibers end to end in such a way as to preserve the integrity of the optical signal with as little signal loss (attenuation) as possible.

To create a typical fiber optic cable assembly a fiber optic cable is terminated, a fiber optic connector is assembled at an end of the cable and the ferrule end face polished. The exactitude of the polished face of a fiber optic ferrule is such that any minute amounts of debris on that end face can block or decrease signal transmission or even damage the end face. Polished ferrule end faces can represent the end result of hours of manufacturing providing a polished ferrule end face to mate to another polished ferrule end face and thereby transfer signals from one fiber into another. Protecting the polished end faces of fiber optic ferrules is extremely important: protection from residual dust from the connector housing; protection from airborn contaminants in the manufacturing facility; protection from the effects of water, oils and chemicals; protection from the effects of temperature cycling, just to name a few. Dust caps as known in the art provide a shield from the physical contact of the delicate ferrule end faces with the outside environment, but do not inherently preventingress of moisture, remediate existing contaminants, and can actually deposit contaminants onto the very ferrule end faces they are designed to protect. Thus, there is an unresolved need for dust cap assemblies that will literally seal the optical ferrule end face, insuring the integrity of the factory polished ferrule, one that is inexpensive, easy to install and remove, and that prevents contamination by water, oil, dust, particulates, damage due to handling, etc.

SUMMARY

The disclosure refers generally to a dust cap assembly for a fiber optic connector and methods for making the same. Specifically, the dust cap assembly physically engages and seals a polished fiber optic ferrule, thereby preserving the cleanliness of the fiber optic ferrule end face. The dust cap assembly comprises at least two components: a sleeve and a sealant. The sleeve has a through bore that physically engages the fiber optic ferrule by a frictional fit. A distal end of the sleeve may include an encapsulating feature that provides a suitable application point for the sealant. The distal end is proximal to the fiber optic ferrule end face, thereby allowing application of the sealant to the encapsulating feature of the sleeve and the fiber optic ferrule end face at the same time.

In one embodiment, the sealant comprises a curable liquid polymer, wherein the curable liquid polymer is easily applied and generally conforms to the geometry present on the distal end of the sleeve and the fiber optic ferrule end face. The sealant transitions from liquid to solid upon curing, encapsulating the fiber optic ferrule end face and protecting it from contaminants such as water, oils, dust, particulates, etc., thereby ensuring the integrity of the polished fiber optic ferrule end face.

In the event that contaminants are present prior to the application of the sealant, the sealant will adhere to such contaminants and lock them in the polymer upon curing. The contaminants, locked in the cured sealant, will come away with the dust cap assembly when the craft removes it from the fiber optic ferrule, leaving a fiber optic ferrule end face surface that may be cleaner than before the dust cap assembly was installed.

A further optional advantage of the present disclosure is the interaction of the dust cap assembly and optical testing equipment used by the craft. In one embodiment, the index of refraction of the cured sealant allows the dust cap assembly to act as a terminator so that the craft can remotely test the optical integrity of an optical system after the system has been installed. If the dust cap assembly is installed on each end of a cable, as in a fiber optic jumper, the encapsulating convex shape of the index matching sealant serves as a lens, allowing light to enter from an external light source sufficient to travel the length of the cable and exit the opposite dust cap assembly and be detected by a photodetector. This helps the craft to quickly determine continuity within the jumper without having to remove the dust cap assembly or optically connect the jumper cable to either the external light source or the testing apparatus. Removing the dust cap and plugging the ferrule into testing equipment runs the risk of damaging or contaminating the polished fiber optic ferrule end face.

The present disclosure provides assurance to the end user that the factory installed, polished fiber optic ferrules remain pristine and in excellent condition for and until their intended use—transmission of optical signals from one optical fiber into another optical fiber.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

BRIEF DESCRIPTION OF THE FIGURES

Embodiments of the disclosure are illustrated by the accompanying drawings, in which.

DETAILED DESCRIPTION

Reference will now be made in detail to the preferred embodiments of the present invention, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

The disclosure generally relates to a dust cap assembly and methods of making the same. The dust cap assembly comprises at least two components for sealing a polished end face of a fiber optic ferrule of a fiber optic ferrule assembly. Sealing a polished end face of a fiber optic ferrule is advantageous to inhibit encroachment of contaminants on the polished end face from the time the polished end face is polished to the time the fiber optic connector assembly is deployed in the field. Simply stated, the disclosure is directed to a dust cap assembly for sealing a fiber optic connector assembly having at least one fiber optic ferrule assembly including a fiber optic ferrule having at least one optical fiber therein. The sleeve has a proximal end and a distal end with a through bore therebetween and is disposed on the at least one fiber optic ferrule, and a sealant at least partially disposed on the sleeve for sealing a portion of the polished end face of the fiber optic ferrule.

Figure 1B:
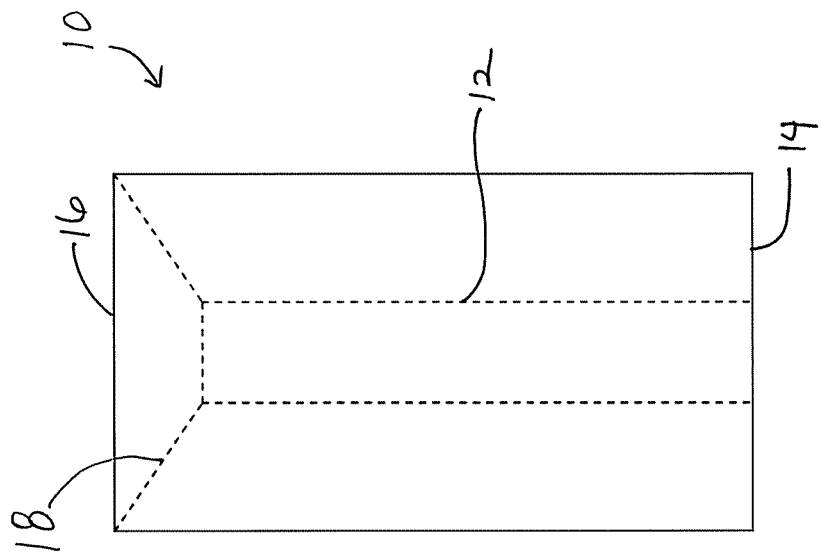
FIGS. 1A and 1B show two views of an embodiment of the sleeve of a dust cap assembly.
Figure 1A:
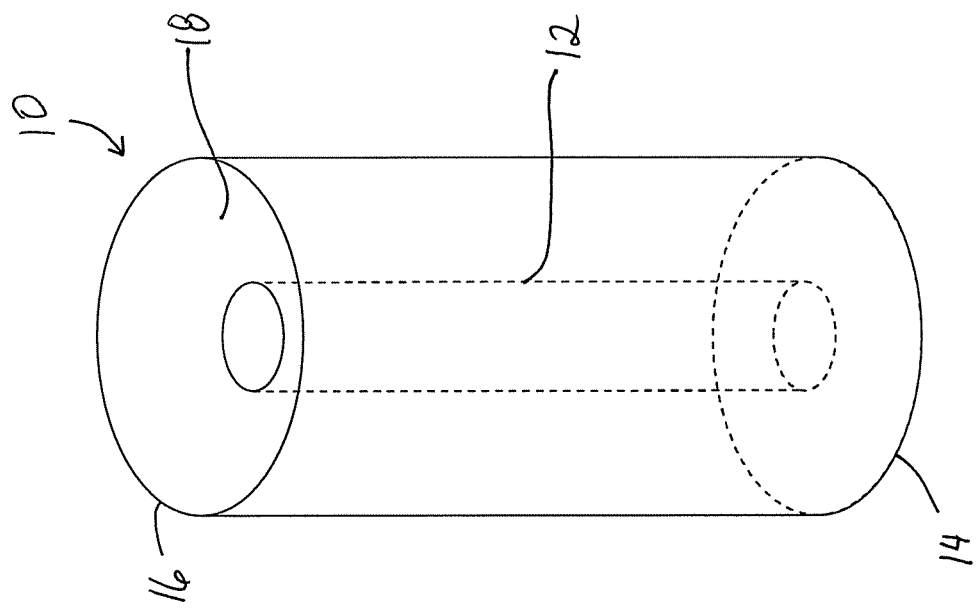
Figure 2B:
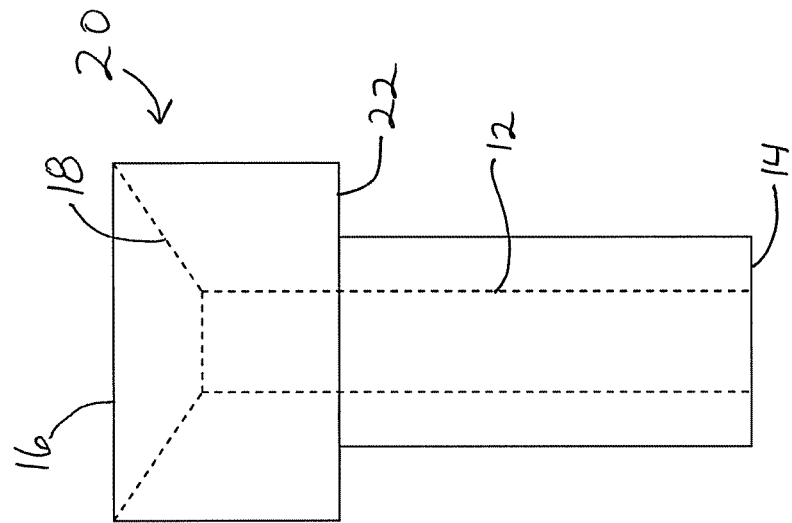
FIGS. 2A and 2B show two views of another embodiment of a sleeve having a shoulder.
Figure 2A:
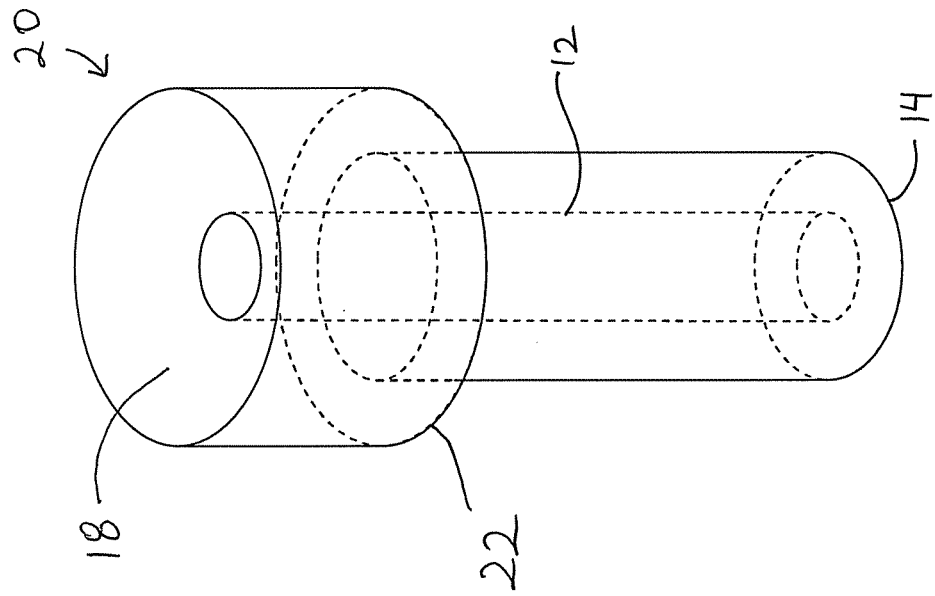

FIGS. 1A and 1B show two different views of a sleeve 10 of the dust cap assembly of the disclosure. In this embodiment, the sleeve 10 is generally straight and has a proximal end 14 and a distal end 16. The proximal end 14 and distal end 16 have a through bore 12 therebetween, creating a generally hollow component. An encapsulating feature 18 proximal to the distal end 16 is in communication with the through bore 12, wherein the encapsulating feature 18 enables the sealing of the polished end face of a fiber optic ferrule. FIGS. 2A and 2B show two different views of a second embodiment of a sleeve 20. Sleeve 20 includes a shoulder 22 for easing the removal of the same from the fiber optic ferrule assembly (e.g., the assembly includes a portion of the fiber optic ferrule and the end of the optical fiber). Sleeve 20 also has distal end 16 and proximal end 14 with a through bore 12 therebetween. Encapsulating feature 18 is proximal to distal end 16 and in communication with through bore 12.

Figure 3B:
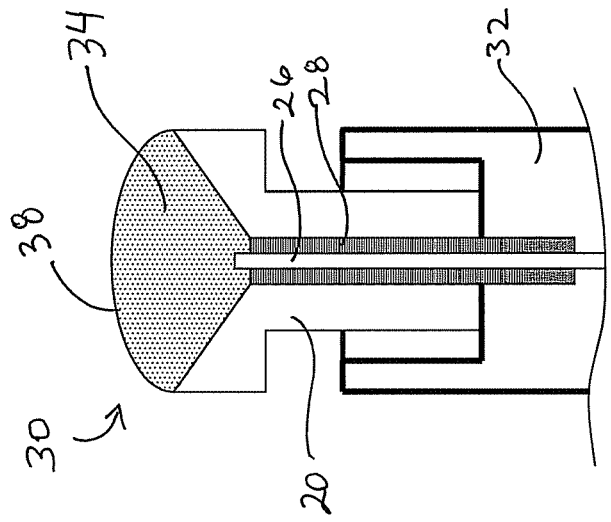
FIG. 3A shows a sectional view of a fiber optic connector with the sleeve installed and FIG. 3B shows a sectional view of the same fiber optic connector and sleeve with the sealant in place.
Figure 3A:
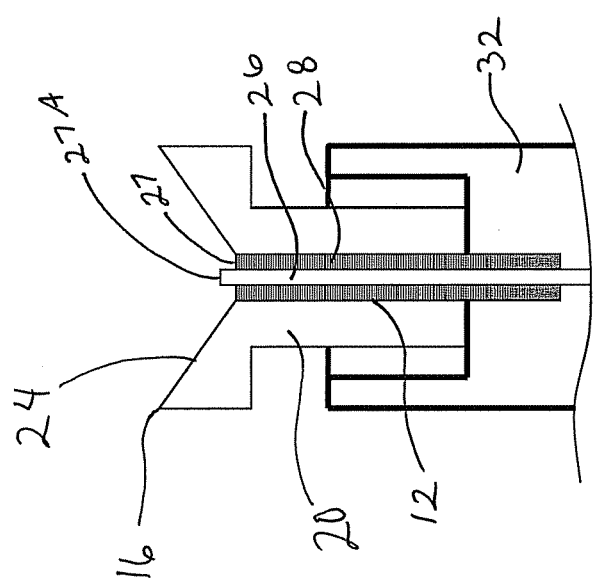
Figure 4B:
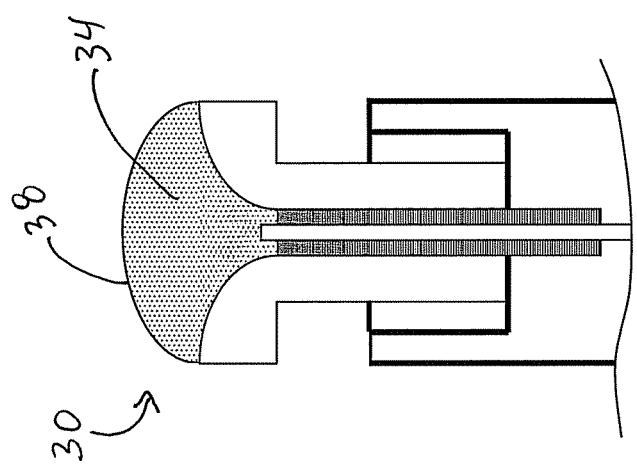
FIG. 4A shows a sectional view of a fiber optic connector with another sleeve installed and FIG. 4B shows a sectional view of the same fiber optic connector connector and sleeve with the sealant in place.
Figure 4A:
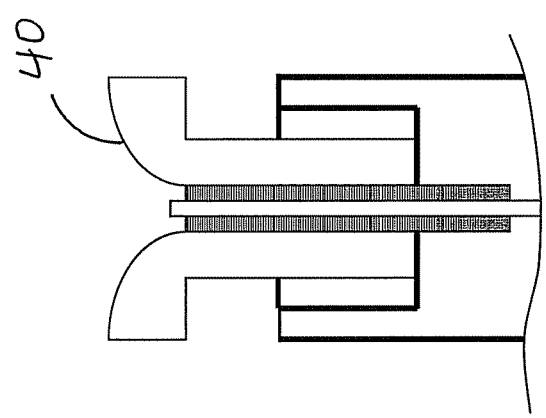
Figure 5B:
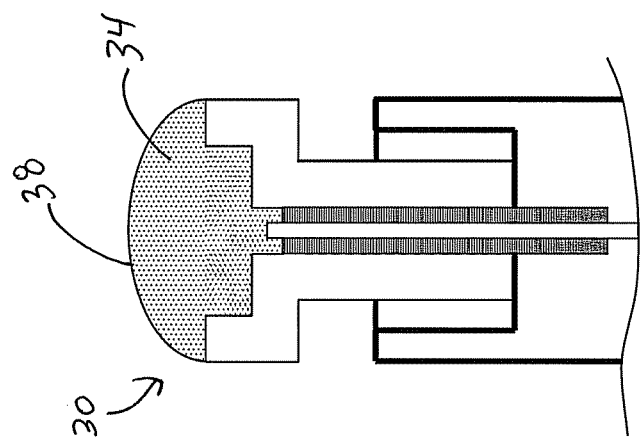
FIG. 5A shows a sectional view of a fiber optic connector with another sleeve installed and FIG. 5B shows a sectional view of the same fiber optic connector and sleeve with the sealant in place.
Figure 5A:
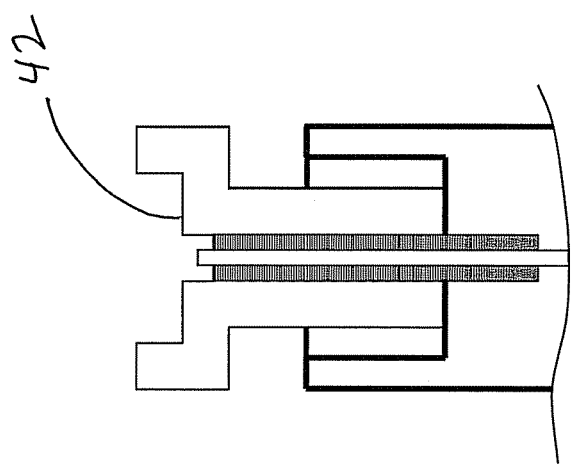
Figure 6B:
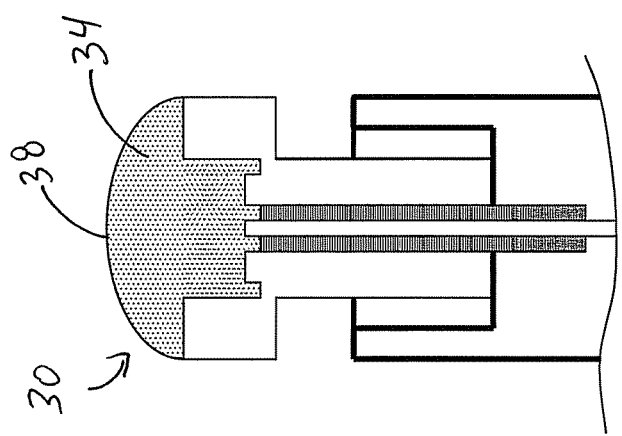
FIG. 6A shows a sectional view of a fiber optic connector with another sleeve installed and FIG. 6B shows a sectional view of the same fiber optic connector and sleeve with the sealant in place.
Figure 6A:
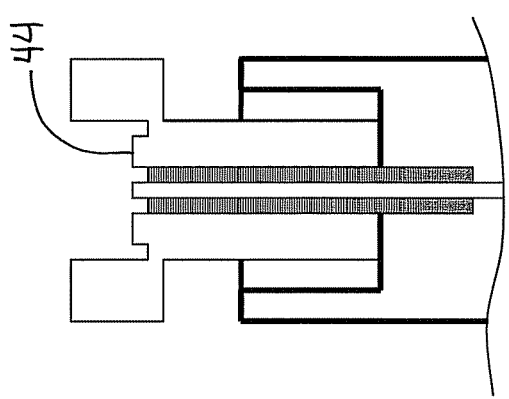

FIGS. 3A-B through FIGS. 6A-B show two different sectional views of respective dust cap assemblies 30 disposed on a fiber optic connector 32 (hereinafter "connector"). FIGS. 3A, 4A, 5A and 6A show connector 32 having a ferrule 28 with a single fiber 26 and respective embodiments of sleeve 20. Ferrules include, but are not limited to, LC, SC and MT, utilizing APC, UPC, pencil tips or flat configurations, made of steel, ceramic, polymer or any other suitable ferrule material. Each ferrule 28 has an exposed polished end face 27, the polished end face 27 having polished fiber face 27A protruding slightly, but the fiber face 27A may be flush or recessed. For purposes of this disclosure polished end face 27 and polished end face 27A are proximal to each other and any further mention of polished end face 27 is meant to include by inference polished fiber face 27A. However, the concepts of the present application may be used on ferrule assemblies that are not polished, where protection is desired. FIG. 3A shows sleeve 20 having an encapsulating feature 18 shaped as a chamfer 24 that extends from the through bore 12 to distal end 16. In a similar fashion, FIGS. 4A, 5A and 6A show respective embodiments of dust cap assembly 30, each having sleeve 20 with different configurations of encapsulating feature 18. In FIG. 4A encapsulating feature 18 is shaped as a radius 40. In FIG. 5A, encapsulating feature 18 is shaped as a step 42 and in FIG. 6A encapsulating feature 18 is shaped as a lip 44. Of course, other suitable geometries are possible as the encapsulating feature. Each of respective FIGS. 3B, 4B, 5B and 6B show sealant 34 generally covering respective portions of the through bore 12 and encapsulating feature 18. Sealant 34 is advantageous for sealing the polished end face 27 and is in direct contact with polished end face 27 as well as portions of encapsulating feature 18.

Figure 7:
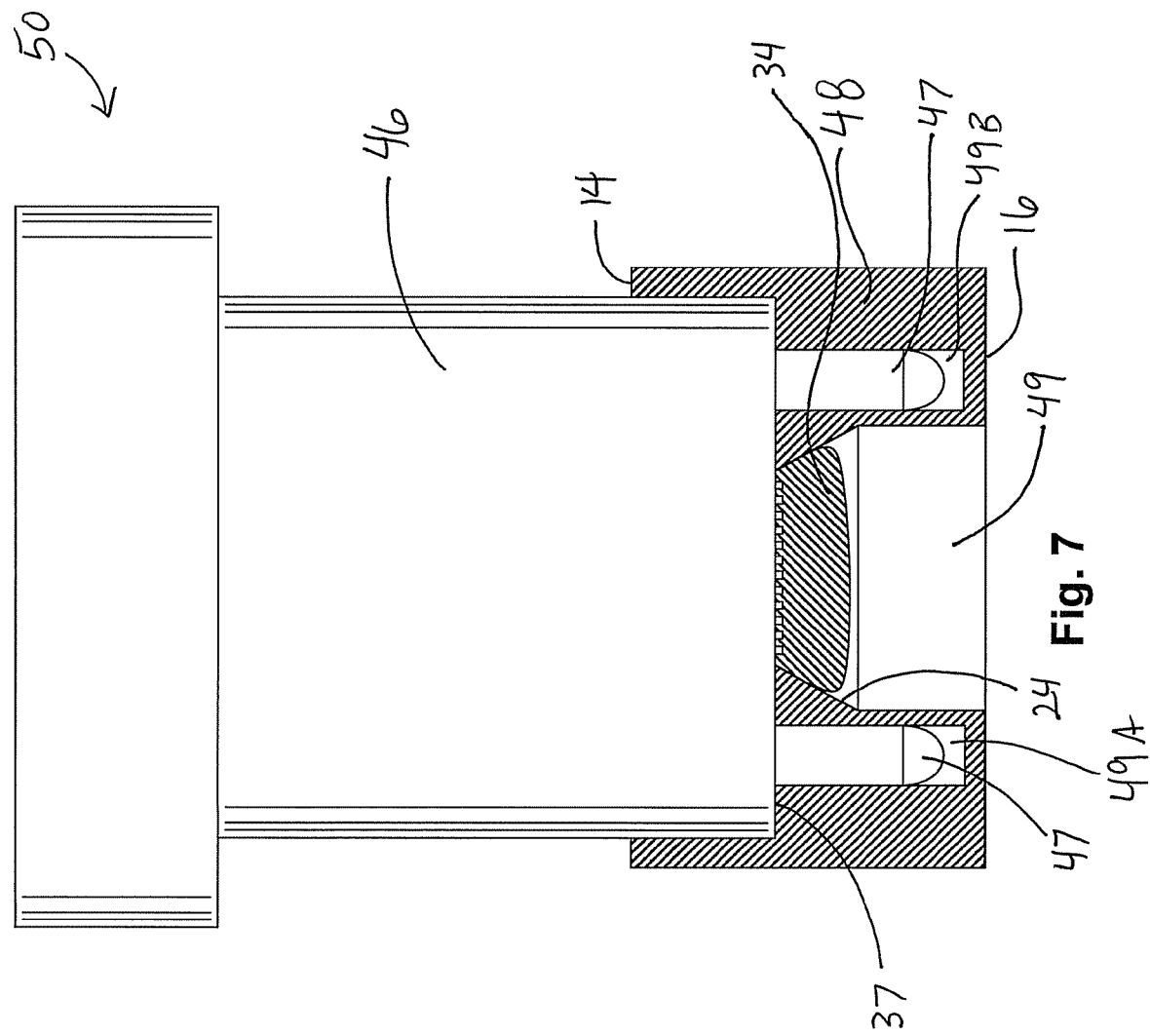
FIG. 7 shows a multi-fiber fiber optic ferrule assembly with the dust cap assembly installed.

FIG. 7 shows a multi-fiber ferrule assembly 50 having a dust cap assembly employing the concepts disclosed herein. In other words, the dust cap assembly includes a sleeve 48 and sealant 34 for sealing a plurality of polished fiber faces and a portion of polished end face 37 of the multi-fiber ferrule 46. Multi-fiber ferrule sleeve 48 is generally rectangular, having proximal end 14 and distal end 16 that generally surrounds the end of multi-fiber ferrule assembly 50 as shown. Specifically, sleeve 48 surrounds a portion of multi-fiber ferrule polished end face 37 of multi-fiber ferrule 46. Multi-fiber ferrule sleeve 48 has a through bore 49 and encapsulating feature 24 shaped as a chamfer, but other geometries are possible. Sealant 34 is in direct contact with chamfer 24 and multi-fiber ferrule polished end face 37, thereby sealing and protecting the multi-fiber ferrule polished end face 37. Multi-fiber ferrule assemblies 50 may include guide pins 47 disposed therein for mating with a complementary ferrule assembly. As shown, guide pins 47 are received and protected from encroachment of sealant 34 by guide pin cavities 49A and 49B formed in sleeve 48. The multi-fiber ferrule sleeve 48 shown in FIG. 7 may have other variations similar to sleeves 10 and 20 of FIGS. 1-6 such as alternative encapsulating features for receiving the sealant 34 for sealing multi-fiber ferrule polished end face 37. Other embodiments of the multi-fiber sleeve may have other geometries such as including one or more protrusions for fitting into the guide pin bores of the ferrule if it does not include guide pins.

Sleeves 10, 20 and 48 of the disclosure may use any suitable material and the bores frictionally engage their respective ferrules, slightly deforming to tightly slide along a medial portion of the respective ferrule. This prevents sealant 34 from wicking down the medial portion of the ferrule, keeping sealant 34 on polished end face 27. By way of example, the sleeve may be a polymer such as a thermoplastic like polycarbonate and a polyacrylate, though other suitable thermoplastics may be used.

Sealant 34 may be any suitable material having the desired properties for sealing and/or optical transmission. In one embodiment, sealant 34 is a curable liquid polymer. The curable liquid polymer starts as a liquid having a viscosity range of generally less than 1000 poise at 23 degrees Celsius, with a preferred range of about 250 poise to about 850 poise at 23 degrees Celsius. This range provides advantageous physical characteristics, e.g., ease of handling, tackiness, and surface tension qualities. For instance, sealant 34 of FIGS. 3-7 shows a generally convex shape 38 distal from the sealed polished end face 27, enabled by the surface tension of sealant 34 while in liquid state; however, other shapes for the sealant such as generally flat are possible. Upon curing, sealant 34 retains its geometry and hardens, enabling sealant 34 to fully integrate with respective sleeves 10, 20 or 48. Encapsulating feature 18 is configured in such a way that when dust cap assembly 30 is removed sealant 34 releases sealed polished end face 27, revealing polished end face 27. The sealant 34 viscosity range allows sealant 34 to flow sufficiently to fully cover polished end face 27 and encapsulating feature 18.

The curable liquid polymer may be a heat curable liquid polymer, an ultraviolet light curable liquid polymer or a chemically reactive liquid polymer. One preferred embodiment of sealant 34 is an ultraviolet light curable liquid polymer for providing the speed and ease of processing. By way of example, one suitable ultraviolet light curable liquid polymer is a UV acrylate that consists essentially of an aliphatic urethane diacrylate, a difunctional acrylate oligomer, and a photoinitiator. The range of ratios of each ingredient are:

100 parts aliphatic urethane diacrylate;
0-40 parts difunctional acrylate oligomer; and
2-6 parts photoinitiator, with a preferred ratio being 100 parts aliphatic urethane diacrylate, 10 parts difunctional acrylate oligomer and 3 parts photoinitiator. This ratio of ingredients provides appropriate sealing, viscosity and optical qualities, enabling sealing, cleaning and testing advantages for dust cap assembly 30.

Additionally, sealant 34 is preferably a hydrophobic polymer, resisting water absorption that can contaminate sealed polished end faces 27. Water ingress can leave deposits on polished end face 27, degrading transmission quality of mated fiber optic connectors. Keeping water and oils away from polished end face 27 effectively insures that contaminants are also prevented from contacting polished end face 27.

Figure 8:
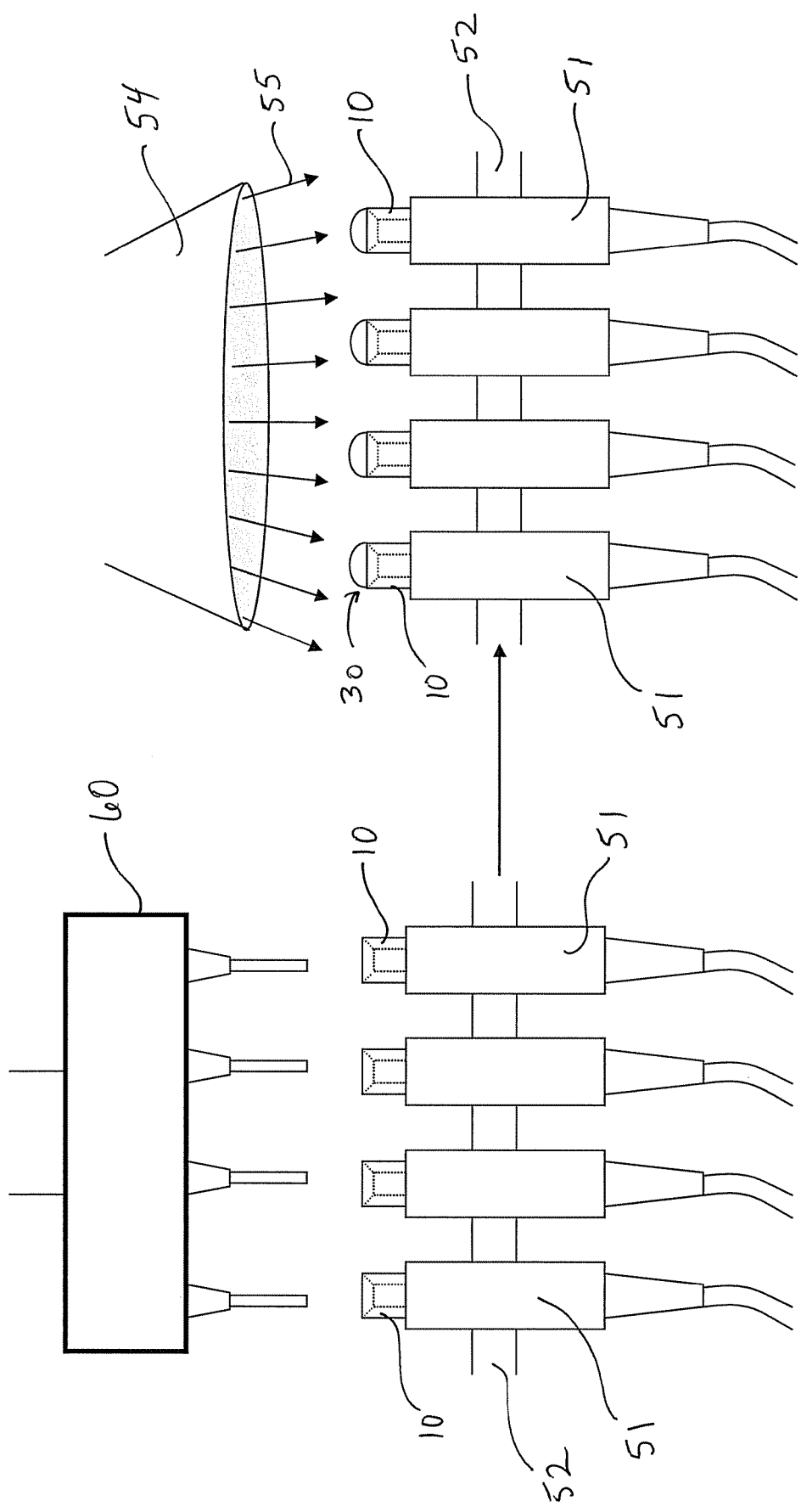
FIG. 8 depicts a first method of sealing a fiber optic ferrule end face using a dispensing head to deposit the sealant and then curing the same.
Figure 9:
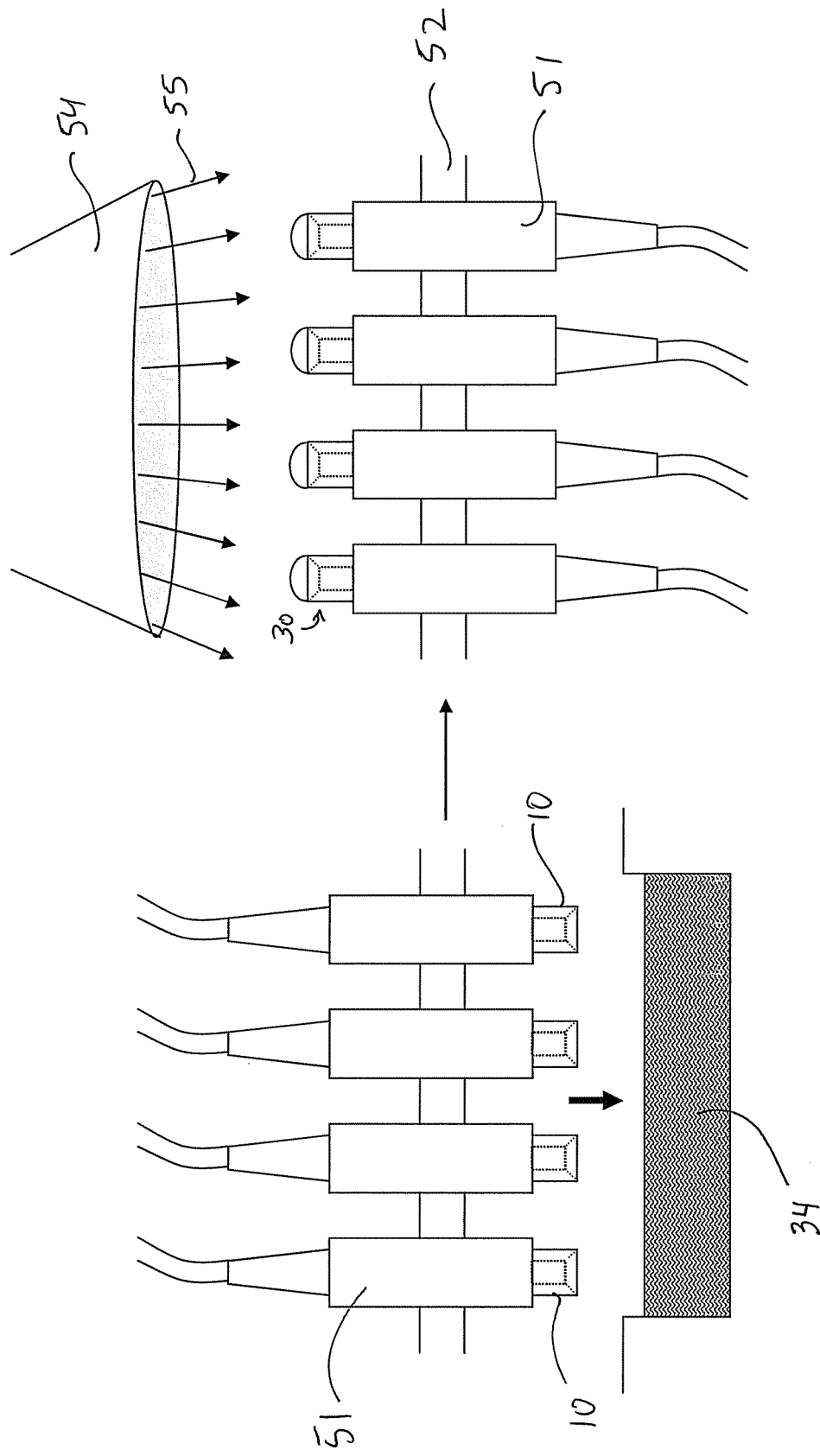
FIG. 9 is a second method of sealing a fiber optic ferrule end face by dipping the sleeve and polished end face into the sealant and then curing the same.

FIGS. 8 and 9 illustrate two different methods for making the dust cap assemblies disclosed herein. Generally speaking, the methods of sealing a fiber optic ferrule end face includes the steps of: providing a fiber optic connector assembly having at least one fiber optic ferrule assembly therein that includes at least one fiber optic ferrule and at least one optical fiber therein, wherein the fiber optic ferrule has a polished end face thereon; providing a sleeve having a proximal end and a distal end with a through bore therebetween; placing the sleeve onto the fiber optic ferrule via the through bore, whereby the polished end face is proximal to the distal end of the sleeve; and depositing a sealant onto the sleeve to cover a portion of the polished end face of the fiber optic ferrule and a portion of the distal end of the sleeve for sealing the fiber optic ferrule end face.

Sleeve 10 is placed onto the ferrule and frictionally engages a medial portion of a ferrule within a fiber optic connector assembly 51. The sleeve 10 is slid onto the ferrule a suitable distance so that the distal end 16 is proximal to polished end face 27. Encapsulating feature 18 exposes polished end face 27, thereby providing a suitable catchment area for the sealant 34 (see FIGS. 3-7). In other words, the distal end 16 may extend beyond the polished end face or be substantially flush with the polished end face 27. Additionally, polished end face 27 may extend slightly beyond distal end 16, but polished end face 27 should be proximal to distal end 16. Sealant 34 is applied by any suitable application means in sufficient quantity to cover both the polished end face 27 and at least a portion of the distal end 16. If there is an encapsulating feature 18 associated with the distal end 16, the sealant 34 should cover the polished end face 27 and the encapsulating feature 18.

FIG. 8 specifically illustrates a method of sealing a fiber optic ferrule end face where a plurality of fiber optic ferrule end faces of respective fiber optic connector assemblies 51 are sealed. As shown, fiber optic connector assemblies 51 having sleeves 10 installed are secured to a common connector holder 52 at regular intervals. Thereafter, dispensing head 60 with a plurality of nozzles matching the regular intervals is brought adjacent to the distal end 16 of the respective sleeves. A controlled amount of sealant 34 within dispensing head 60 is deposited out by mechanical, pneumatic, and/or electrical means onto the respective distal ends 16, covering a portion of distal ends 16 and polished end faces 27 of respective fiber optic connector assemblies 51. Then, connector holder 52 is moved to a curing station as represented by the arrow. In this embodiment, an ultraviolet light curable polymer sealant is used and an ultraviolet light source 54 for curing the same. A suitable dose and exposure time is selected for ultraviolet light 55, thereby providing the desired cure as shown.

FIG. 9 illustrates another explanatory method of sealing a fiber optic ferrule end face where a plurality of fiber optic ferrule end faces of respective fiber optic connector assemblies 51 are sealed. Like the other method, the plurality of fiber optic connector assemblies 51 having respective sleeves 10 are secured to connector holder 52. The plurality of fiber optic connector assemblies 51 are inverted and the distal ends 16 of sleeves 10 are brought into contact with the surface of sealant 34, allowing a small quantity of sealant 34 contained within a suitable container to adhere to the distal end 16 and polished end face 27. The viscose properties of the sealant 34 will promote even coating on the surfaces. Thereafter, connector holder 52 is reverted until the dust cap assembles 30 point vertically upwards and then moved into proximity of an ultraviolet light source, or other curing means as appropriate. Thereafter, the dust cap assemblies 30 are exposed to a suitable amount of ultraviolet light 55 for curing the sealant. Although the methods discussed disclosed making a plurality of dust cap assemblies at once, the concepts are applicable to making individual dust cap assemblies.

Figure 10A:
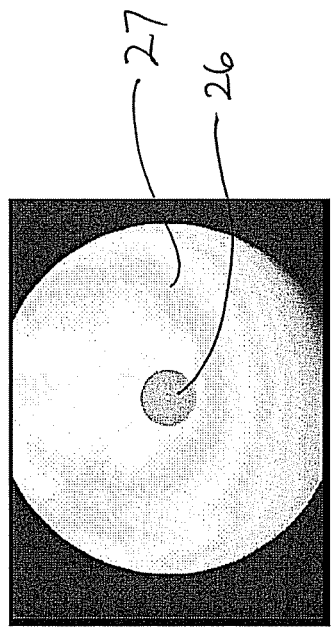
FIG. 10A shows an artistic rendering of a "clean" polished end face before application of the dust cap assembly and FIG. 10B shows an artistic rendering of the polished end face of FIG. 10A after the dust cap assembly was removed.
Figure 10B:
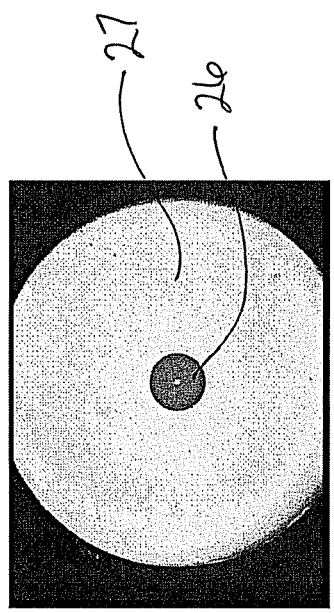

Referring to FIGS. 10A-B and 11A-B, one can see the results of sealing polished end face 27 of a ferrule assembly through artistic renderings of actual test samples. FIG. 10A shows an artistic rendering of actual clean, newly polished end face 27 and polished fiber face 26. FIG. 10B shows an artistic rendering of actual polished end face 27 of FIG. 10A after dust cap assembly 30 was installed and removed. As shown, the polished end faces 27 in both illustrations are clean. In other words, the end face was clean at the time of manufacture and sealing, and retained its clean state when the dust cap assembly was removed.

Figure 11B:
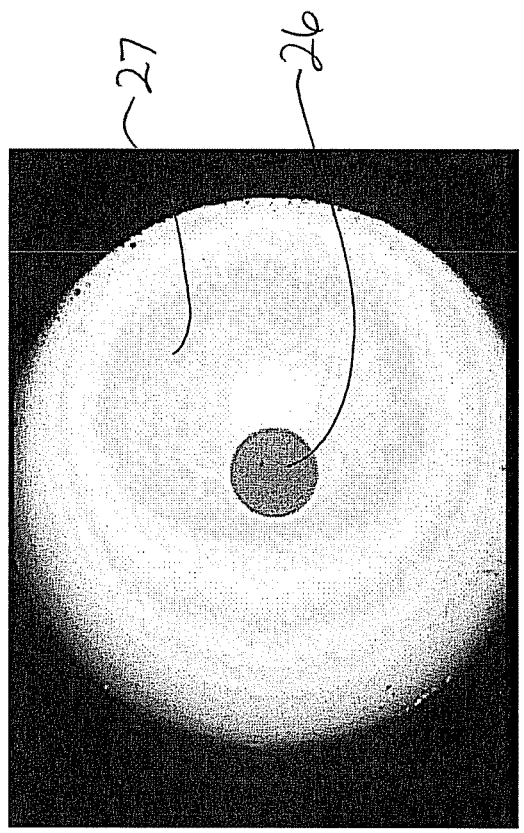
FIG. 11A shows an artistic rendering of a "dirty" polished end face before application of the dust cap assembly and FIG. 11B shows an artistic rendering of the polished end face of FIG. 10B after the dust cap assembly was removed FIG. 12 schematically shows a jumper cable assembly with the dust cap assembly on each end during continuity testing.
Figure 11A:
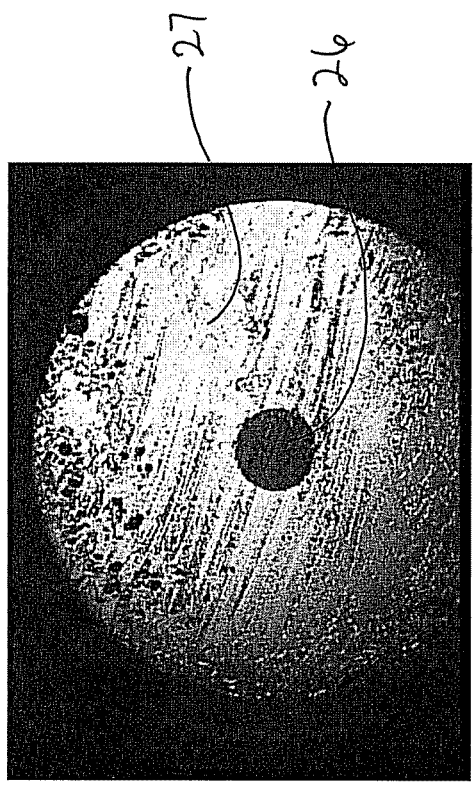

FIG. 11A shows an artistic rendering of actual polished end face that is contaminated at the time of manufacture such as by dust and the like. Dust cap assembly 30 was installed and FIG. 11B shows artistic rendering of the results after dust cap assembly 30 was removed. The same polished end face 27 of FIG. 11A is very clean in FIG. 11B after removing the dust cap assembly. Simply stated, dust cap assembly 30, utilizing sealant 34, is able to remedially clean polished end faces 27. This is advantageous due to the environmental conditions within a processing facility; dust, pollen, particulate matter, moisture, oils, lint, etc., are usually floating in the air and can stick to polished end face 27. Dust cap assembly 30 protects polished end face 27 while residing on the ferrule, and further, upon removal, cleans any incidental contaminants present on polished end face 27 at the time of the installation of dust cap assembly 30.

Additionally, the dust cap assembly 30 can provide other optional functionality. For instance, sealant 34 such as disclosed herein can have advantageous post-cure optical properties. The pre-cure viscosity range allows the sealant to create a convex shape 38 about the sealed polished end face 27. By way of example, the convex shape 38 may have a tangential contact angle of greater than about 5 degrees and less than about 90 degrees, preferably about 10 degrees. Additionally, the formulation of the sealant may provide a post-cure index of refraction (RI) within the range of between about 1.45 to about 1.48 at 23 degrees Celsius and at a wavelength of 589 nm, most preferably between about 1.460 and about 1.466 at 23 degrees Celsius. At 1310 nm wavelength RI of the cured sealant at 23 degrees Celsius should be about 1.45. This range of RI closely matches most commercial optical fiber and allows the optical signal to travel into the sealant. This RI range also helps the dust cap assembly to withstand very high power levels, as high as 23 dBm for testing as discussed below.

Figure 12:
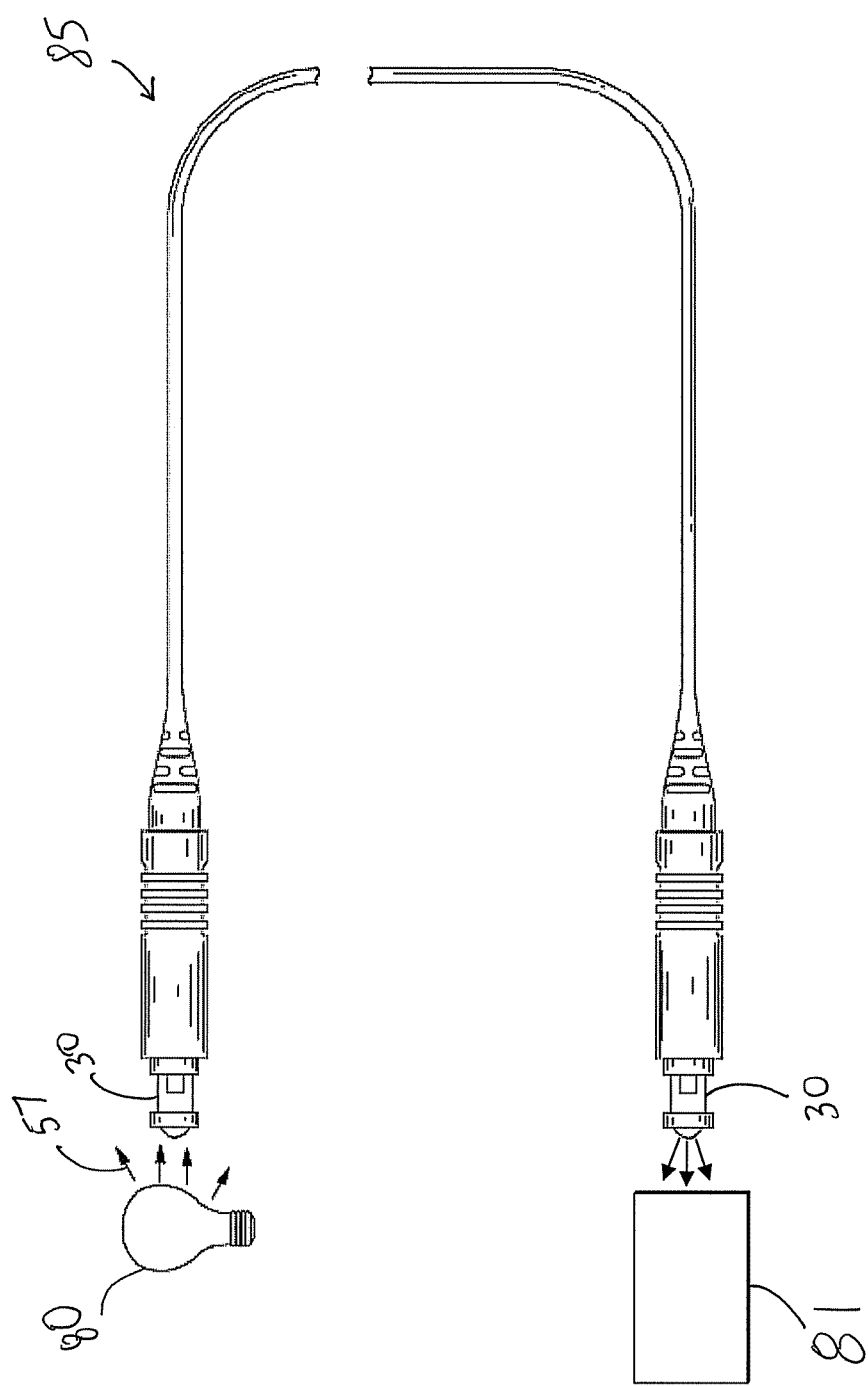

Simply stated, the convex shape 38 of the sealant coupled with the preferred RI of the cured sealant 34, allows light to enter the dust cap assembly with great efficiency since there is no gap between the sealant 34 and polished end face 27 and then escape from the sealant. Illustratively, FIG. 12 shows a jumper cable assembly 85 with dust cap assemblies 30 installed on both ends. An external light source 80 is proximal to a first dust cap assembly 30 and a photoreceptor 81 is proximal to a second dust cap assembly 30. Emitted light 57 from the external light source 80 (represented by the arrows) enters the first dust cap assembly 30 and travels along the jumper cable assembly 85 and then exits the second dust cap assembly 30 where it is detected by photoreceptor 81. This enables a continuity test for jumper cable assembly 85. Photoreceptor 81 is useful to determine the amount of actual light transmitted, regardless of wavelength. If external light source 80 is a visible light source the photoreceptor 81 may be simply the human eye (not shown). The continuity test advantageously does not require removal of dust cap assemblies 30, thereby maintaining a pristine end face until the dust cap assemblies are removed for installation of the jumper cable assembly 85.

Figure 13:
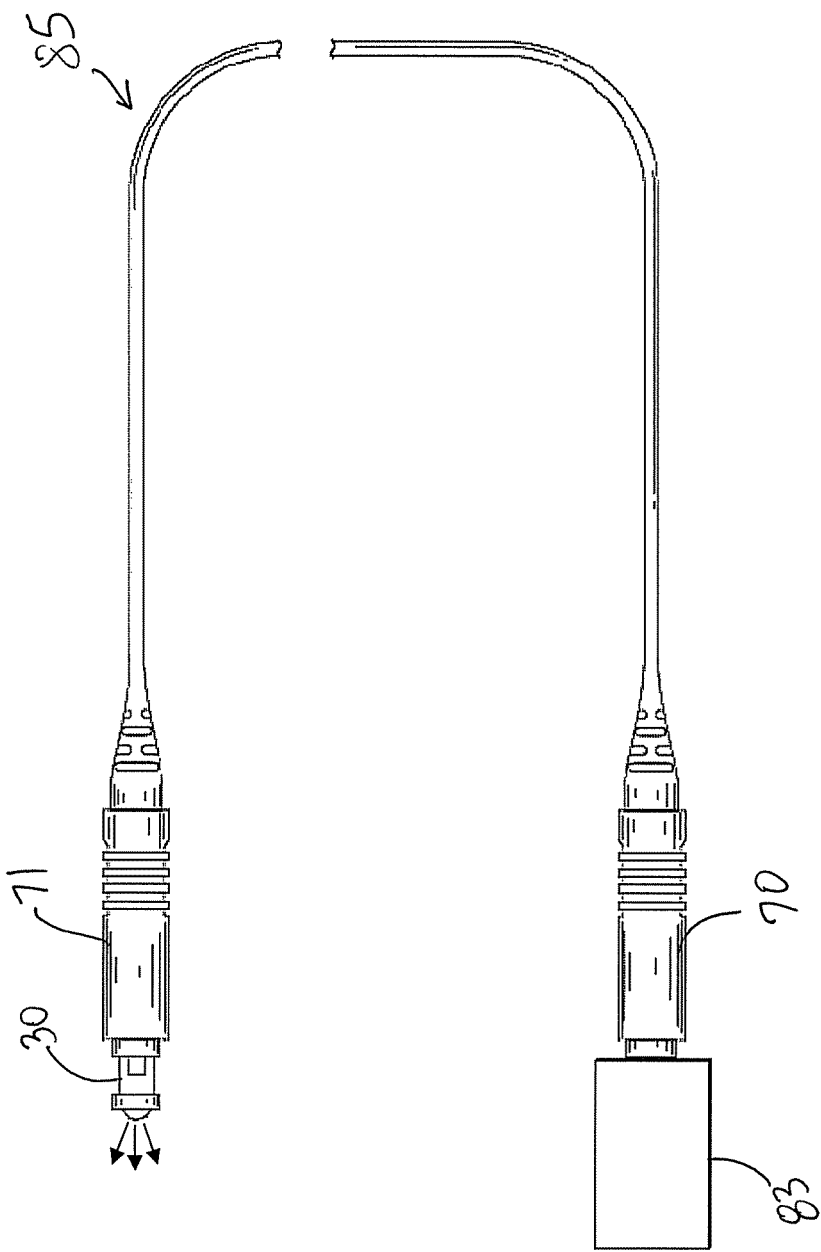
FIG. 13 schematically shows a jumper cable assembly with a first connector optically connected to a test apparatus and a second connector having a dust cap assembly during testing for backreflection.
Figure 14:
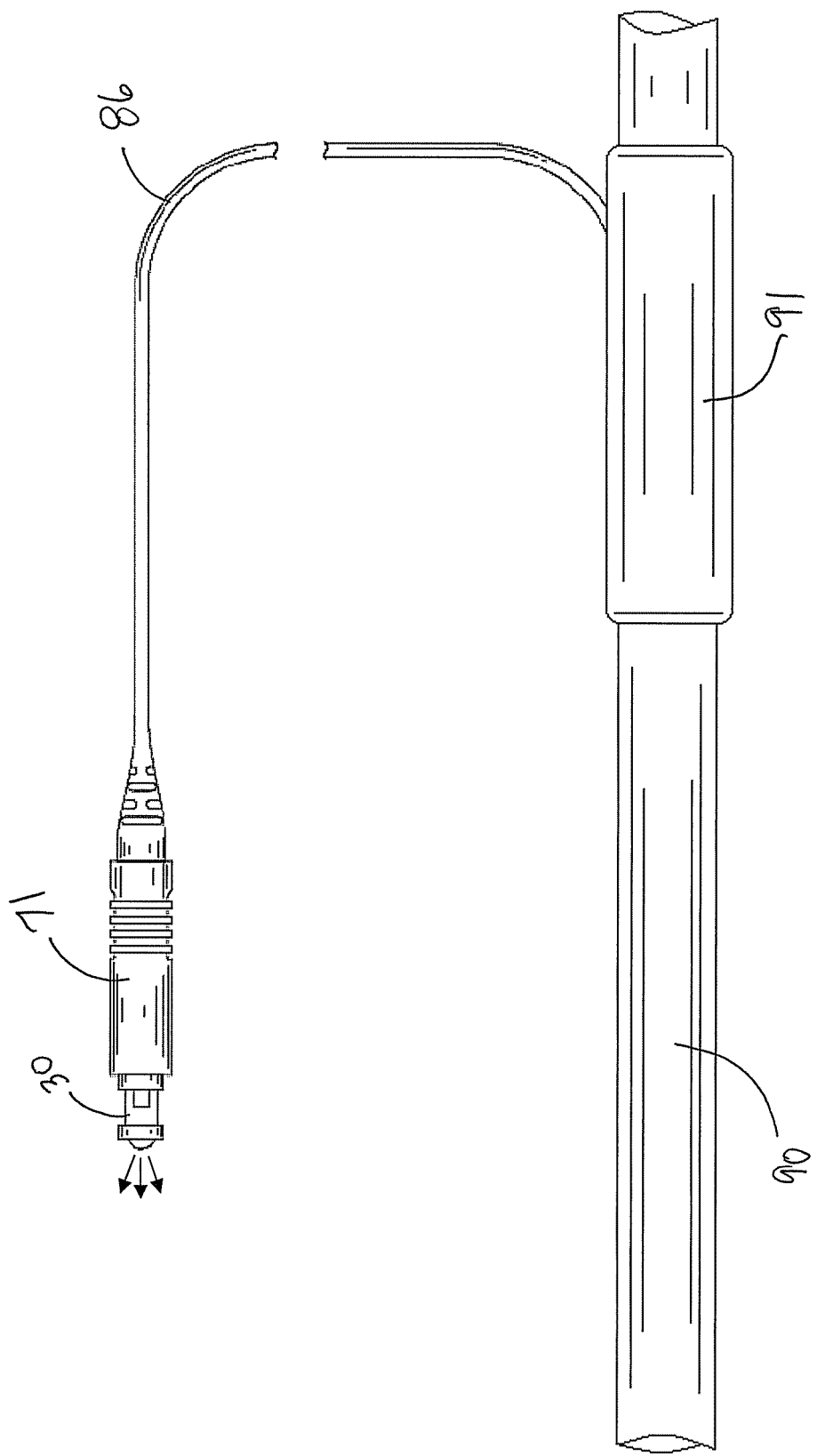
FIG. 14 shows a fiber optic cable assembly with a trunk cable and tether, the tether having a dust cap assembly acting as a terminator.

Other improvements in testing are possible with assemblies using the dust cap assemblies disclosed herein. FIGS. 13 and 14 use the geometric and optical qualities of dust cap assembly 30 for improving a reflectance test. The reflectance test is useful since it can reveal a lot of useful information to the craft such as the integrity of a cable assembly. An unterminated distal connector (e.g., not connected to another connector, other device, or other means to inhibit backreflection) without the dust cap assembly disclosed herein can be a source of a large backreflection spike. This large spike in reflected signal is detrimental to the quality of light emitting devices such as VCSELs that rely on amplified internal reflections to boost their signal. Backreflected light entering such a light emitting device can cause noise or utterly disrupt the signal.

In the past discrete terminators needed to be installed as conventional dust caps did not have the inherent utility of a terminator. Placing an index matching gel, or index matching block was one way to terminate a cable assembly. Mandrel wrapping the cable multiple times to a radius beyond the minimum bend radius of the particular optical fiber was another, causing the light signal to reflect out of the cladding wall instead of being reflected from the end. However, this mandrel wrapping method is not effective with new bend-insensitive optical fibers that direct light along their specialized core almost regardless of bend radius. Thus, another type of terminator is necessary in such cases. Dust cap assembly 30 optionally provides a ready made terminator along with the functionality of sealing, protecting and cleaning the polished end face 27.

Terminating the distal fiber optic connector assembly 71 eliminates the spike in backreflection, causing the light from the light source or test apparatus 83 to pass out of the dust cap assembly 30 as shown in FIG. 13. Specifically, the convex shape 38 of the sealant prevents most light from reflecting back into the optical fiber, and by consequence, back to the light source or test apparatus 83. FIG. 13 shows a first fiber optic connector assembly 70 of jumper cable assembly 85 optically connected to test apparatus 83. A second fiber optic connector assembly 71 is not optically connected to any device, but has dust cap assembly 30 installed. Test apparatus 83, such as an OTDR or the like, sends a pulse of light into jumper cable assembly and takes minute amounts of backreflection and determines the integrity of the fiber optic cable assembly. The dust cap assembly 30 serves as a terminator to prevent the large spike in backreflection commonly associated with light passing from a polished fiber face into air. The amount of backreflection allowed by the dust cap assembly 30 is not more than −50 dB, and in most cases as little as −60 dB. FIG. 14 shows a cable assembly having a fiber optic trunk cable 90 and a cable access point 91 with a fiber optic tether cable 86 issuing from the cable access point 91. The distal end of the fiber optic tether cable 86 has fiber optic connector assembly 71, with dust cap assembly 30 installed. Light from a remote upstream source such as a central office (not shown) or the like can be sent from the fiber optic trunk cable 90, into the fiber optic tether cable 86 and to the fiber optic connector assembly 71, to pass out of the dust cap assembly 30, again greatly reducing the backreflection spike commonly found at the polished fiber face/air interface.

The foregoing is a description of various embodiments of the disclosure that are given here by way of example only. Although a dust cap assembly for sealing a fiber optic ferrule according to the disclosure has been described with reference to preferred embodiments and examples thereof, other embodiments and examples may perform similar functions and/or achieve similar results. All such equivalent embodiments and examples are within the spirit and scope of the present invention and are intended to be covered by the appended claims.

We claim:

1. A dust cap assembly for sealing a fiber optic connector assembly comprising:
at least one fiber optic ferrule assembly including a fiber optic ferrule having at least one optical fiber therein, wherein the fiber optic ferrule assembly has a polished end face;
a sleeve, having a proximal end and a distal end with a through bore therebetween, the sleeve being removably disposed on the at least one fiber optic ferrule, wherein the through bore is in communication with at least one encapsulating feature on at least the distal end; and
a curable liquid sealant at least partially disposed on the sleeve, creating a removable seal that upon curing encompasses at least a portion of the polished end face of the fiber optic ferrule such that upon removal of the sleeve and sealant from the at least one fiber optic ferule assembly remedial cleaning of the portion of the polished end face occurs.

2. The assembly of claim 1, wherein the sleeve frictionally engages a portion of the fiber optic ferrule.

3. The assembly of claim 1, wherein the at least one fiber optic ferrule is a multi-fiber fiber optic ferrule.

4. The assembly of claim 3, wherein the sleeve frictionally engages a portion of the multi-fiber fiber optic ferrule.

5. The assembly of claim 1, wherein the sealant is a curable liquid polymer selected from the group consisting of a heat curable liquid polymer, an ultraviolet light curable liquid polymer and a chemically reactive liquid polymer.

6. The assembly of claim 5, wherein the curable liquid polymer has a pre-cure viscosity range of about 1000 poise or less at 23 degrees Celsius.

7. The assembly of claim 5, wherein the curable liquid polymer has a pre-cure viscosity range of about 250 poise to about 850 poise at 23 degrees Celsius.

8. The assembly of claim 5, wherein the curable liquid polymer has a post-cure index of refraction between about 1.45 to about 1.48 at 23 degrees Celsius.

9. The assembly of claim 5, wherein the curable liquid polymer has a post-cure index of refraction between about 1.460 to about 1.466 at 23 degrees Celsius.

10. The assembly of claim 1, wherein the sealant is a hydrophobic polymer.

11. The assembly of claim 1, wherein the sealant is an ultraviolet light curable hydrophobic polymer consisting essentially of an aliphatic urethane diacrylate, a difunctional acrylate oligomer, and a photoinitiator.

12. The assembly of claim 1, wherein the encapsulating feature consists of a chamfer, a lip, a step and a radius.

13. The assembly of claim 1, wherein at least a portion of the sealant generally forms a convex shape.

14. The assembly of claim 1, wherein the sleeve is comprised of a thermoplastic.

15. The assembly of claim 14, the thermoplastic being selected from the group consisting of a polycarbonate, a polyolefin, a polyamide and a polyacrylate.

16. The assembly of claim 1, wherein the sealant is in direct contact with the entire the polished end face of the fiber optic ferrule.

17. The assembly of claim 1, wherein the sealant is also in direct contact with a portion of the at least one encapsulating feature.

18. The assembly of claim 1, wherein the sealant covers the portion of the polished end face of the fiber optic ferrule.

19. A dust cap assembly for sealing a fiber optic connector assembly comprising:
at least one fiber optic ferrule assembly including:
a fiber optic ferrule and
at least one optical fiber disposed within the fiber optic ferrule,
wherein the fiber optic ferrule assembly has a polished end face;
a sleeve removably disposed on the at least one fiber optic ferrule, the sleeve comprising:
a proximal end,
a distal end,
a through bore therebetween, and
at least one encapsulating feature disposed proximal to the distal end; and
a sealant at least partially disposed on the sleeve and the at least one encapsulating feature, the sealant comprising a curable liquid that encapsulates the polished end face, adheres to contaminants present on the polished end face, and locks the contaminants in the sealant upon curing such that upon removal of the sleeve and sealant from the at least one fiber optic ferule assembly remedial cleaning of the polished end face occurs.

20. A dust cap assembly for sealing a fiber optic connector assembly comprising:
at least one fiber optic ferrule assembly including a fiber optic ferrule having at least one optical fiber therein, wherein the fiber optic ferrule assembly has a polished end face;
a sleeve, having a proximal end and a distal end with a through bore therebetween, the sleeve being removably disposed on the at least one fiber optic ferrule, wherein the through bore is in communication with at least one encapsulating feature on at least the distal end; and
a sealant at least partially disposed on the sleeve, creating a removable seal that is in direct contact with a portion of the polished end face of the fiber optic ferrule such that upon removal of the sleeve and sealant from the at least one fiber optic ferule assembly remedial cleaning of the portion of the polished end face occurs, wherein the sealant is a curable liquid polymer selected from the group consisting of a heat curable liquid polymer, an ultraviolet light curable liquid polymer and a chemically reactive liquid polymer.

21. The assembly of claim 20, wherein the curable liquid polymer has a pre-cure viscosity range of about 1000 poise or less at 23 degrees Celsius.

22. The assembly of claim 20, wherein the curable liquid polymer has a pre-cure viscosity range of about 250 poise to about 850 poise at 23 degrees Celsius.

23. The assembly of claim 20, wherein the curable liquid polymer has a post-cure index of refraction between about 1.45 to about 1.48 at 23 degrees Celsius.

24. A dust cap assembly for sealing a fiber optic connector assembly comprising:
- at least one fiber optic ferrule assembly including a fiber optic ferrule having at least one optical fiber therein, wherein the fiber optic ferrule assembly has a polished end face;
- a sleeve, having a proximal end and a distal end with a through bore therebetween, the sleeve being removably disposed on the at least one fiber optic ferrule, wherein the through bore is in communication with at least one encapsulating feature on at least the distal end; and
- a sealant at least partially disposed on the sleeve, creating a removable seal that is in direct contact with a portion of the polished end face of the fiber optic ferrule such that upon removal of the sleeve and sealant from the at least one fiber optic ferule assembly remedial cleaning of the portion of the polished end face occurs, wherein the sealant is a hydrophobic polymer.

25. The assembly of claim 24, wherein the hydrophobic polymer is an ultraviolet light curable hydrophobic polymer consisting essentially of an aliphatic urethane diacrylate, a difunctional acrylate oligomer, and a photoinitiator.

* * * * *